(12) United States Patent
Cook

(10) Patent No.: US 8,001,993 B2
(45) Date of Patent: Aug. 23, 2011

(54) DEAD BAND REDUCTION IN ELECTRONICALLY CONTROLLED VALVES

(75) Inventor: Daniel S. Cook, Terryville, CT (US)

(73) Assignee: Enfield Technologies, LLC, Trumbull, CT (US)

( * ) Notice: Subject to any disclaimer, the term of this patent is extended or adjusted under 35 U.S.C. 154(b) by 983 days.

(21) Appl. No.: 11/973,276

(22) Filed: Oct. 5, 2007

(65) Prior Publication Data

US 2008/0129364 A1   Jun. 5, 2008

Related U.S. Application Data

(60) Provisional application No. 60/854,562, filed on Oct. 25, 2006.

(51) Int. Cl.
*F16K 31/02* (2006.01)
(52) U.S. Cl. ......... 137/625.64; 137/625.65; 251/129.04; 251/905; 91/361
(58) Field of Classification Search ............. 251/129.04, 251/129.01, 905; 91/361; 137/625.65, 625.64
See application file for complete search history.

(56) References Cited

U.S. PATENT DOCUMENTS

| | | | | |
|---|---|---|---|---|
| 3,821,625 | A | * | 6/1974 | Scholl ............................. 91/361 |
| 4,513,782 | A | * | 4/1985 | Contartese et al. ............. 91/361 |
| 5,012,722 | A | * | 5/1991 | McCormick ............. 251/129.01 |
| H1191 | H | * | 6/1993 | Hutchison et al. ........ 137/625.65 |
| 5,261,234 | A | * | 11/1993 | Holloway et al. ........ 137/625.65 |
| 5,285,715 | A | * | 2/1994 | Elrod et al. ............. 137/625.65 |
| 5,950,668 | A | * | 9/1999 | Baumann .................. 251/129.04 |
| 5,960,831 | A | | 10/1999 | Borcea et al. ............ 137/625.65 |
| 6,257,118 | B1 | * | 7/2001 | Wilbur et al. ................... 91/361 |
| 6,427,970 | B1 | * | 8/2002 | Silva ........................ 251/129.01 |
| 6,789,558 | B2 | * | 9/2004 | Coakley et al. .......... 137/625.65 |
| 7,209,321 | B1 | | 4/2007 | Bennett ......................... 360/108 |

OTHER PUBLICATIONS

Data sheet SLOS401A, Sep. 2002 (revised Oct. 2002) for the DRV593/DRV594 from Texas Instruments, and subtitled "±3-A High-Efficiency PWM Power Driver", 23 pages.
Data sheet SBOs120, entitled "INA-145" and subtitled "Programmable Gain Difference Amplifier" (Mar. 2000 printing date), from Burr-Brown, Tucson, AZ, 13 pages.
Data Sheet DS39598E, entitled "PIC16F818/819 Data Sheet" and subtitled "18/20-Pin Enhanced Flash Microcontrollers with nanoWatt Technology" (2004), from Microchip, 176 pages.
Data sheet 29319.37H, entitled "3959" and subtitled DMOS Full-Bridge PWM Motor Driver (no date given), from Allegro Microsystems, Inc., Worcester, MA., 12 pages.
Data Sheet SBOS105, entitled "INA157" and subtitled "High-Speed, Precision Difference Amplifier", (Mar. 1999 printing date), from Burr-Brown, Tucson, AZ, 10 pages.

(Continued)

*Primary Examiner* — John Bastianelli
(74) *Attorney, Agent, or Firm* — Harrington & Smith

(57) ABSTRACT

An apparatus includes dead band reduction circuitry. The dead band reduction circuitry includes an input configured to receive an input signal and an output configured to provide an output signal. The dead band circuitry is configured to apply compensation to the input signal to create the output signal. The output is configured to be coupled to an electronically controlled valve. The valve is configured to use the output signal to control movement of a valve member in the valve. The valve member includes one or more lands that overlaps an associated one or more openings. The one or more lands are sized relative to an associated one or more openings such that a dead band is caused. The compensation is defined to reduce the dead band.

18 Claims, 18 Drawing Sheets

OTHER PUBLICATIONS 26-2000 Series, "High Pressure Reducing Up to 15,000 PSIG in/up to 10,000 PSIG out spring loaded/dome loaded/air actuated", revised Apr. 2004, Tescom Corporation, Elk River, MN 55330, USA, 4 pages.

* cited by examiner

LS-V05 SPOOL DISPLACEMENT vs. VALVE COIL CURRENT (IDEAL)

APERTURE AREA vs. SPOOL DISPLACEMENT (IDEAL)

| COMMAND (VDC) | FEEDBACK (VDC) |
|---|---|
| 0.000 | 0.10 |
| 1.000 | .965 |
| 2.000 | 1.972 |
| 3.000 | 2.952 |
| 4.000 | 3.93 |
| 5.000 | 4.95 |
| 4.000 | 3.88 |
| 3.000 | 2.88 |
| 2.000 | 1.924 |
| 1.000 | .928 |
| 0.000 | .011 |
| 1.000 | .979 |
| 1.010 | .981 |
| 1.020 | .986 |
| 1.030 | .981 |
| 1.040 | .985 |
| 1.050 | 1.004 |
| 1.040 | .998 |
| 1.030 | 1.002 |
| 1.020 | 1.000 |
| 1.010 | .995 |
| 1.000 | 1.012 |

FIG.7

| COMMAND (VDC) | FEEDBACK (VDC) |
|---|---|
| 0.000 | 0.10 |
| 1.000 | .985 |
| 2.000 | 1.963 |
| 3.000 | 2.966 |
| 4.000 | 3.92 |
| 5.000 | 4.91 |
| 4.000 | 3.90 |
| 3.000 | 2.92 |
| 2.000 | 1.961 |
| 1.000 | .978 |
| 0.000 | .013 |
| 1.000 | .983 |
| 1.010 | .989 |
| 1.020 | .997 |
| 1.030 | 1.011 |
| 1.040 | 1.018 |
| 1.050 | 1.031 |
| 1.040 | 1.016 |
| 1.030 | 1.007 |
| 1.020 | .998 |
| 1.010 | .986 |
| 1.000 | .977 |

FIG.8

| COMMAND (VDC) | FEEDBACK (VDC) |
|---|---|
| 0.000 | .004 |
| 1.000 | 1.001 |
| 2.000 | 2.000 |
| 3.000 | 3.000 |
| 4.000 | 4.00 |
| 5.000 | 4.99 |
| 4.000 | 4.00 |
| 3.000 | 3.00 |
| 2.000 | 2.000 |
| 1.000 | 1.001 |
| 0.000 | .005 |
| 1.000 | 1.000 |
| 1.010 | 1.010 |
| 1.020 | 1.021 |
| 1.030 | 1.030 |
| 1.040 | 1.040 |
| 1.050 | 1.050 |
| 1.040 | 1.040 |
| 1.030 | 1.030 |
| 1.020 | 1.020 |
| 1.010 | 1.011 |
| 1.000 | 1.000 |

FIG.9

DEAD BAND REDUCTION IN ELECTRONICALLY CONTROLLED VALVES

CROSS-REFERENCE TO RELATED APPLICATIONS

The present application claims the benefit under 35 U.S.C. §119(e) of U.S. Provisional Patent Application No. 60/854,562, filed on 25 Oct. 2006, the disclosure of which is hereby incorporated by reference in its entirety.

TECHNICAL FIELD

This invention relates generally to control systems and, more specifically, relates to controllers and systems using electronically controlled valves, electronically controlled valves, and portions thereof.

BACKGROUND

Electronically controlled pneumatic and hydraulic valves are used in a wide variety of applications. Typically, in these types of valves, there is some type of magnetized element that is responsive to a magnetic field producing element, such as an electrical coil (commonly called a voice coil). A valve member is coupled either to the magnetized element or to the magnetic field producing element. A portion (typically called a spool) of the valve member fits into a sleeve, which contains a number of openings. Lands on the spool are defined to completely cover, partially cover, or uncover associated ones of the openings in the sleeve, depending on the position of the valve member, the positioning of which is controlled at least in part by current through the magnetic field producing element.

Such positioning may also be influenced by other elements of valve design. For example, one or more springs are positioned and designed so that when there is no current through the magnetic field element, the lands cover associated openings. The valve is therefore in a closed position when "off" in this example. As the current to the magnetic field producing element is modified, the valve member will move and therefore the openings will be partially or completely uncovered by the associated lands. In some valves, the valve member can move in both "positive" and "negative" directions. Examining a single set of openings and an associated land for instance, in a positive direction, coupling of fluid occurs from this single set of openings to a second set of openings, and in a negative direction, coupling of fluid occurs from the single set of openings to a third set of openings. A positive current will cause movement in the positive direction, and a negative current will cause movement in the negative direction. It is noted that the above description is merely exemplary and should not be construed to be limiting in any way.

In order to reduce unwanted leakage yet maintain relative ease of manufacturing, the lands are typically somewhat larger than associated openings. What this means is that there is some amount of positive or negative current that has to be applied in order to cause the valve member and lands to move enough to begin uncovering associated openings. Consequently, there is a range of positions in which modification of the input current to the magnetic field element causes no associated modification in valve output. Valve output may be quantified through, e.g., an increase in the percentage of aperture area created by uncovering the openings. This phenomenon of modification of input current but no modification of valve output is called a dead band, or more specifically a mechanical dead band. Dead bands mean that control of the valve is not as accurate as it could be. Therefore, it would be beneficial to reduce or eliminate this dead band.

BRIEF SUMMARY

In an exemplary embodiment, a method is disclosed that includes receiving an input signal and applying compensation to the input signal to create an output signal. The output signal is configured to be applied to an electronically controlled valve and the valve is configured to use the output signal to control movement of a valve member in the valve. The valve member includes at least one land that overlaps an associated at least one opening. The at least one land is sized relative to an associated at least one opening such that a dead band is caused. The compensation is defined to reduce the dead band. The method also includes outputting the output signal.

In another exemplary embodiment, an apparatus includes dead band reduction circuitry. The dead band reduction circuitry includes an input configured to receive an input signal and an output configured to provide an output signal. The dead band circuitry is configured to apply compensation to the input signal to create the output signal. The output is configured to be coupled to an electronically controlled valve. The valve is configured to use the output signal to control movement of a valve member in the valve. The valve member includes at least one land that overlaps an associated at least one opening. The at least one land is sized relative to an associated at least one opening such that a dead band is caused. The compensation is defined to reduce the dead band.

In a further exemplary embodiment, a computer program product is disclosed that includes program instructions embodied on a tangible computer-readable medium. Execution of the program instructions resulting in operations including receiving an input signal and applying compensation to the input signal to create an output signal. The output signal is configured to be applied to an electronically controlled valve and the valve is configured to use the output signal to control movement of a valve member in the valve. The valve member includes at least one land that overlaps an associated at least one opening. The at least one land is sized relative to an associated at least one opening such that a dead band is caused. The compensation is defined to reduce the dead band. The operations also include outputting the output signal.

BRIEF DESCRIPTION OF THE DRAWINGS

The attached Drawing Figures include the following:

FIG. 7 is a table of commands and corresponding feedback illustrating accuracy for a pressure control scheme using the exemplary voice coil pneumatic valve of FIG. 2, but without using dither or dead band correction circuitry;

FIG. 8 is a table of commands and corresponding feedback illustrating accuracy for a pressure control scheme using the exemplary voice coil pneumatic valve of FIG. 2, while using dither but without dead band correction circuitry;

FIG. 9 is a table of commands and corresponding feedback illustrating accuracy for a pressure control scheme using the exemplary voice coil pneumatic valve of FIG. 2, while using both dither and dead band correction circuitry;

DETAILED DESCRIPTION OF EXEMPLARY EMBODIMENTS

For ease of reference, this disclosure is separated into the following sections: Exemplary System Introduction; Introduction to Dead Band Causes and Effects; Dead Band Reduction for Typical Pneumatic and Hydraulic Valves; and Dead Band Reduction for Exemplary Pneumatic Valves.

I. Exemplary System Introduction

Figure 1:
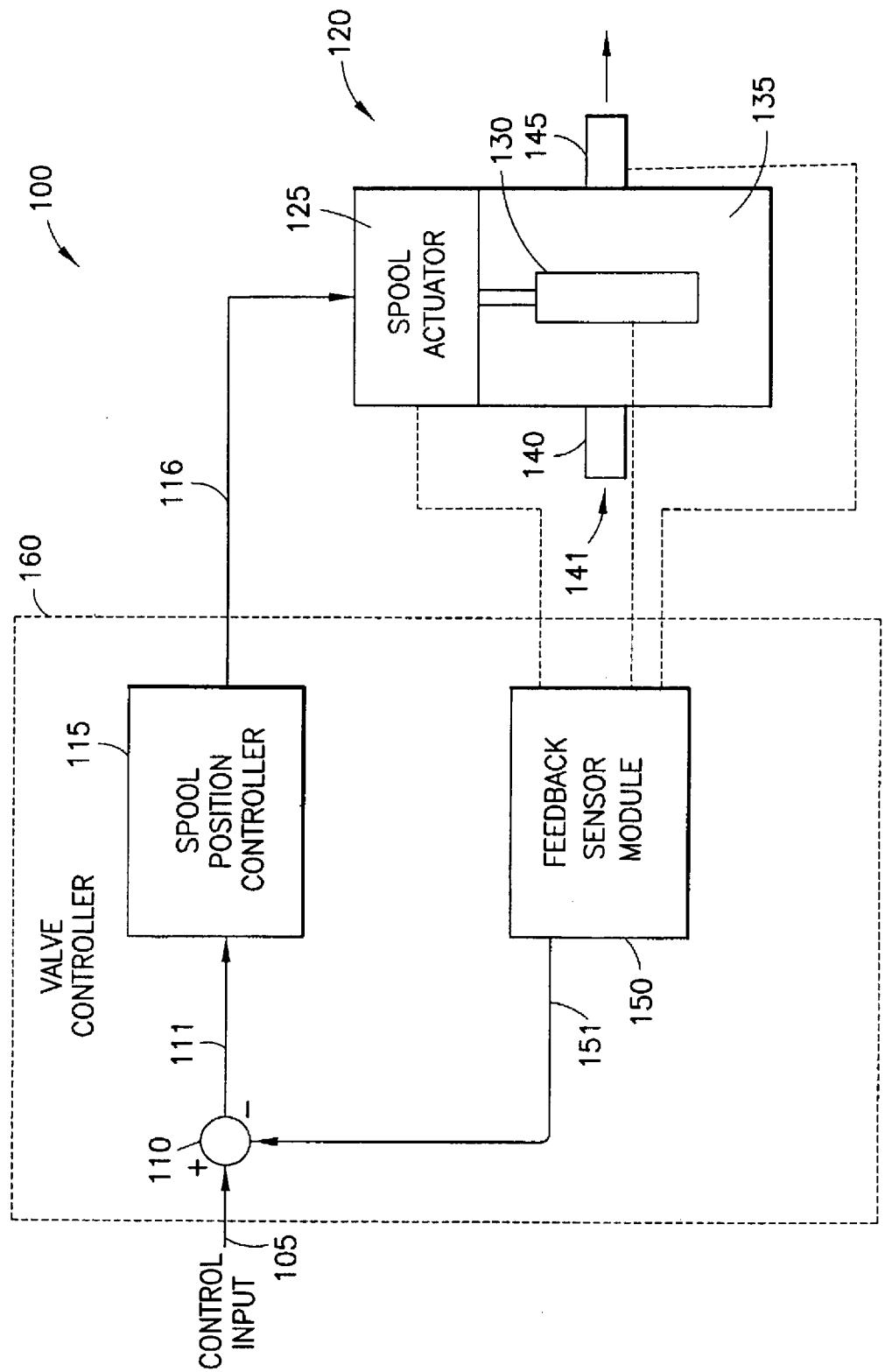
FIG. 1 is a block diagram of a system including a portion for controlling an electronically controlled valve and the electronically controlled valve.

Referring now to FIG. 1, a block diagram is shown of an exemplary system 100 having a portion for controlling an electronically controlled valve 120. System 100 also includes in this example the electronically controlled valve 120. FIG. 1 is a simplistic, high-level view of a system 100 that includes a control input 105, an adder 110, a spool position controller 115, the electronically controlled valve 120, and a feedback sensor module 150 that takes an input from one or more feedback sensors (not shown) and that produces one or more feedback signals 151. A valve controller 160 includes the adder 110, the spool position controller 115, and the feedback sensor module 150. The electronically controlled valve 120 includes a spool actuator 125, such as a voice coil, a spool 130, a body 135, an input 140, and an output 145.

The electronically controlled valve 120 controls fluid (e.g., air, gas, water, oil) 141 flow through the electronically controlled valve 120 by operating the spool 130. The spool actuator 125 controls movement of the spool 130 based on one or more control signals 116 from the spool position controller 115. The spool position controller 115 modifies the one or more control signals 116 based on the one or more input signals 111, which include addition of the control input signal 105 and the one or more feedback signals 151. The feedback sensor module 150 can monitor the spool actuator 120 (e.g., current through the spool actuator), a sensor indicating the position of the spool 130, or sensors indicating any number of other valve attributes (e.g., pressure or flow rate of the fluid 141).

Now that an introduction has been given with regard to an exemplary system 100, descriptions will be given of dead band causes and effects.

II. Introduction to Dead Band Causes and Effects

This section describes specific examples of pneumatic valves and dead band causes and effects. Additionally, transfer characteristics of a portion of the system 100 will be used to illustrate the effects of dead band on general pneumatic and hydraulic valves.

Figure 2:
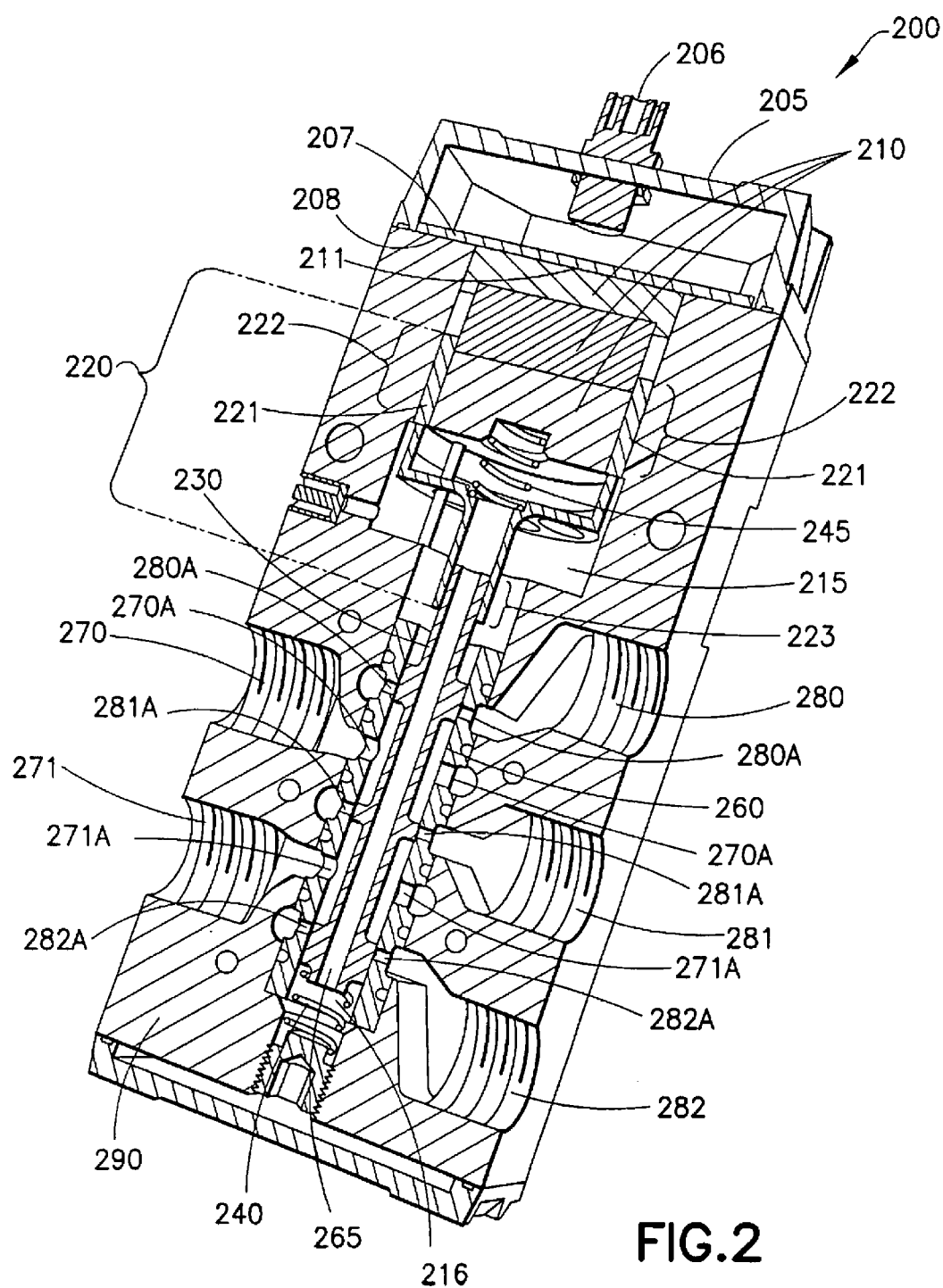
FIG. 2 is a cutaway, perspective view of an exemplary pneumatic valve.

Turning to FIG. 2 in addition to FIG. 1, a cutaway, perspective view is shown of an exemplary pneumatic valve 200. The pneumatic valve 200 includes an electronics cover 205, a motor housing retainer 207, a motor housing 210, an upper cavity 215, a lower cavity 216, a coil header assembly 220, a spool 230, a sleeve 260, a lower spring 240, an upper spring 245, external ports 270, 271, 280, 281, and 282, circumferentially spaced internal ports 270A, 271A, 280A, 281A, and 282A, and a valve body 290. Coil header assembly 220 includes a voice coil portion 222 having a voice coil 221 and an overlap portion 223 that overlaps a portion of the spool 230 and connects the spool 230 to the coil header assembly 220. The spool actuator 125 of FIG. 1 includes, in the example of FIG. 2, motor housing 210, coil header assembly 220, upper spring 245, and lower spring 240. It is noted that at least a portion of the motor housing 210 is magnetized in order to be responsive to the voice coil 221.

In this example, a top surface 211 of the motor housing 210 contacts a bottom surface 208 of motor housing retainer 207. The motor housing 210 is therefore held in place by the motor housing retainer 207, and the motor housing retainer 207 is a printed circuit board.

The spool 230 includes in this example a passage 265. The passage 265 has a number of purposes, including equalizing pressure between the upper cavity 215 and the lower cavity 216. The passage 230 is included in an exemplary embodiment herein, but the spool 230 may also be manufactured without passage 265 (see FIG. 3). The electronics cover 205 includes a connector 206 used to couple a spool position controller 115 to the voice coil 221 on voice coil portion 222. Typically, this connection is made through a ribbon cable (not shown). The electronics cover 205 is one example of a cover.

A description of exemplary operation of the valve 200 is included in U.S. Pat. No. 5,960,831, the disclosure of which is hereby incorporated by reference in its entirety. U.S. Pat. No. 5,960,831 describes, for instance, airflow through the external ports 270, 271, 280, 281, and 283 and the circumferentially spaced internal ports 270A, 271A, 280A, 281A, and 282A. It is noted that the springs 240, 245 along with the coil header assembly 220, motor housing 210, and spool 230, are configured such that the spool 230 blocks the ports 280A, 281A, and 282A when no power is applied to the voice coil 221. Other portions of pneumatic valve 200 are also described in U.S. Pat. No. 5,960,831.

Figure 3:
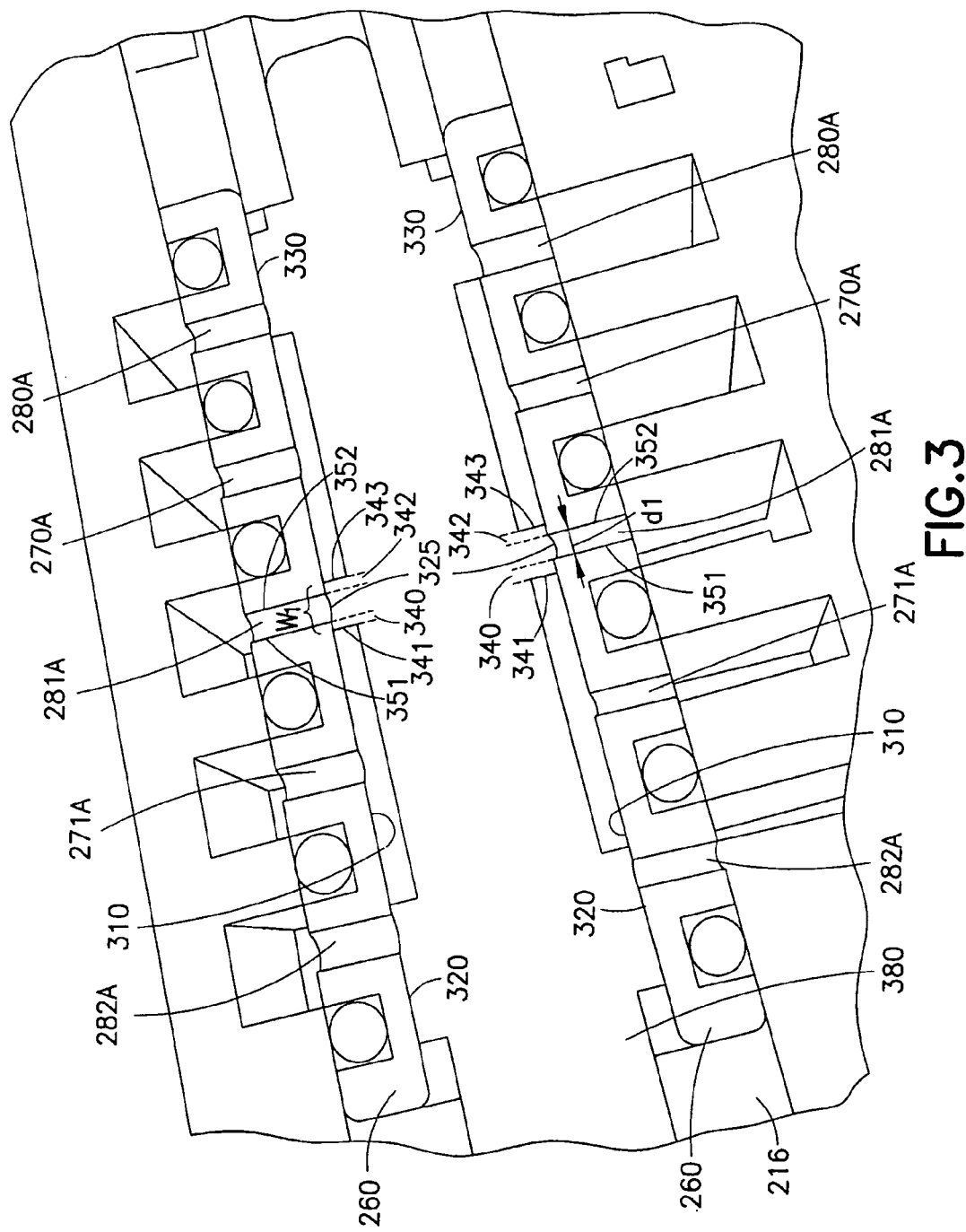
FIG. 3 is a cutaway view of a valve body of the pneumatic valve of FIG. 2, showing spool and sleeve overlap at zero position (spring return to center, coil current=zero)

Turning to FIG. 3 in addition to FIG. 2, in the example of FIG. 3, a portion of the pneumatic valve 200 of FIG. 2 is shown wherein the spool 230 of FIG. 2 is solid and shown as spool 380. The spool 380 of FIG. 3 has several 'lands' 320, 325, and 330 that block airflow from the ports 282A, 271A, 281A, 270A, and 280A (collectively, "ports" herein) in the sleeve 260. To minimize air leakage due to the miniature gaps between the lands 320, 325, and 330 and the inner surface 310 of the sleeve 260, the lands 320, 325, and 330 of the spool 380 are machined to be slightly wider when the valve is in the closed/off position (i.e., as shown in FIG. 3) than the diameter of the ports. A common design approach in order to minimize leakage is therefore to widen the spool land width (e.g., $W_1$) wider than the diameter (e.g., $d_1$) of a port. This effort serves to effectively increase flow restriction (and therefore decrease leakage) by providing a smaller effective cross-sectional area to length aspect ratio. The land 325 (for instance) therefore has an overlap including portions 340 and 342 relative to the diameter of the port 281A. This construction limits air leakage, but creates a natural 'dead band' where small spool displacements (and corresponding modifications to signal 116) will cause no change in aperture area. Therefore, small spool displacements will result in no change in air flow. Aperture area in terms of FIG. 2 corresponds to how much of one of the ports (e.g., portion 281A) is not covered by the associated land (e.g., land 325). Since less leakage is more desirable, it seems more desirable to have a wider land width. However, a wider land width introduces inaccuracies because of the dead band when trying to converge in the final control system.

Minimization of leakage may also be accomplished by minimizing the mechanical clearance between the lands 320, 325, and 300 of the spool 230 and the inner surface 310 of the sleeve 260. The upper bound for minimizing clearance is mechanical friction and manufacturability, and minimizing clearance causes increased manufacturing costs.

There will always be a desire to increase the spool land width (and therefore increase the dead band) to decrease leakage or to maintain leakage as the spool/sleeve fit is more loose (and therefore, easier and less costly to manufacture). However, as described above, increasing the land width also increases the dead band, leading to less effective control over the fluid and more inaccuracies. On the other hand, minimizing clearance increases manufacturing costs. Therefore, both of these techniques have problems.

A simple model can be created to explain the dead band region problem associated with typical pneumatic and hydraulic spool and sleeve valves. Consider the system portion 1200 of FIG. 12, in which the electronically controlled valve 120 has an input of the one or more control signals 116 and has an output 1210. In this case, the output 1210 is characterized by aperture area, which can also be defined as a percentage of valve area that is unimpeded.

Assuming that valve 120 is described by the valve 200 shown in FIG. 3, the port 281A is completely covered in the closed/off position, as shown in FIG. 3. The port 281A will be coupled to the port 271A when the side 341 of the land 325 is between the locations 351 and 352. The port 281A is unimpeded (e.g., at maximum aperture) when the side 341 is at or to the right of location 352. Thus, the aperture area will go from zero for this port (when side 341 matches location 351) to maximum (when side 341 matches location 352). This aperture area can be considered to be a "positive" aperture area. In another situation, the port 281A will be coupled to the port 270A when the side 343 of the land 325 is between the locations 351 and 352. The port 281A is unimpeded (e.g., at maximum aperture area) when the side 343 is at or to the left of location 351. Thus, the aperture area will go from zero (when side 343 matches location 352) to maximum (when side 343 matches location 351). This aperture area can be considered to be a "negative" aperture area.

Figure 12:
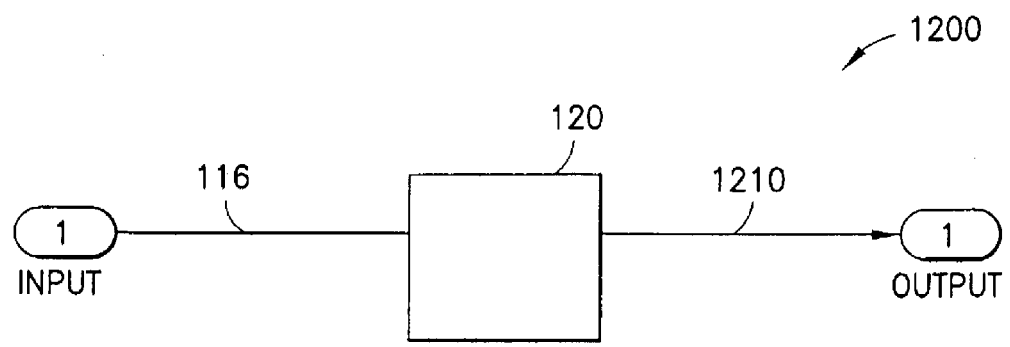
FIG. 12 is a block diagram of a portion of a system used to characterize a typical valve transfer characteristic.
Figure 13:
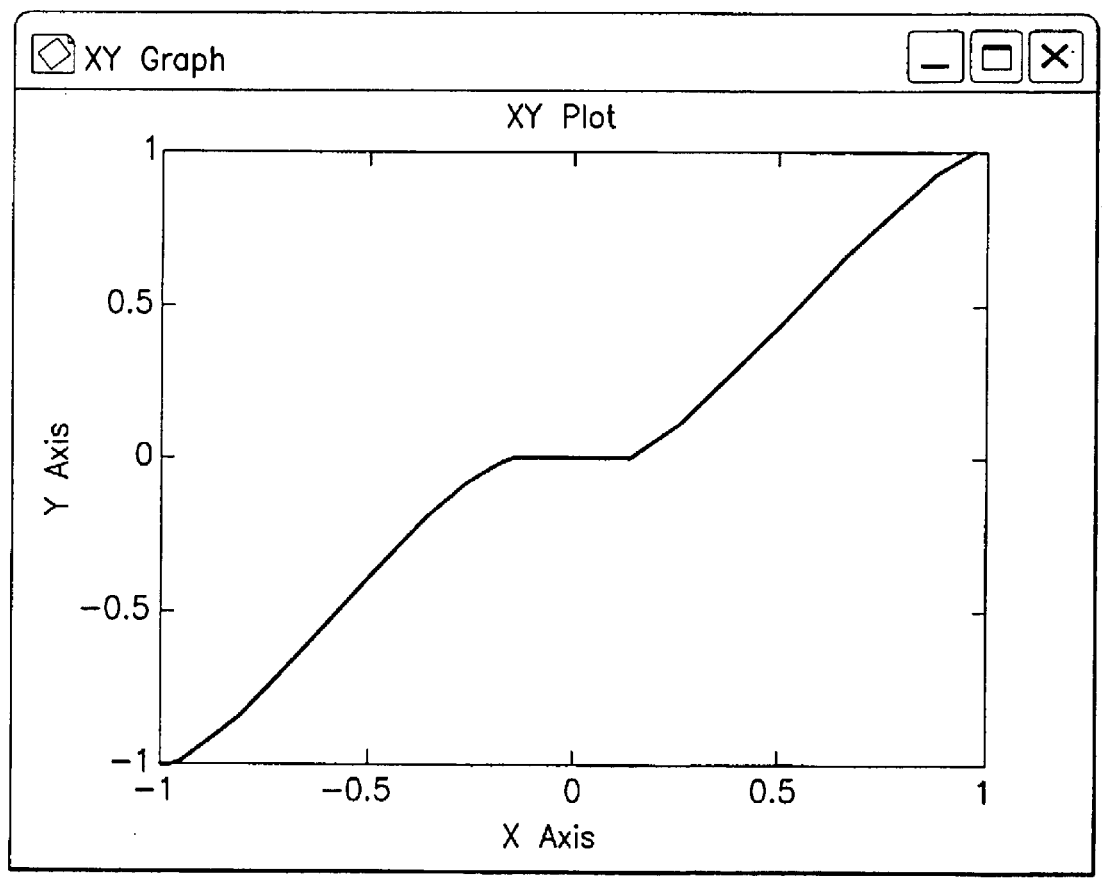
FIG. 13 is a plot of a transfer characteristic of the system of FIG. 12.

Turning to FIG. 13, a transfer characteristic is shown of the system of FIG. 12. The X axis represents the control signal(s) 116 and the Y axis represents the aperture area. In the transfer characteristic plot of FIG. 13, it is apparent that there is a significant discontinuity around the zero input value, where the output does not change for a corresponding change in the input (as described above, termed 'dead band'). It would be beneficial to reduce or eliminate this dead band.

III. Dead Band Reduction for Typical Pneumatic and Hydraulic Valves

Figure 14:
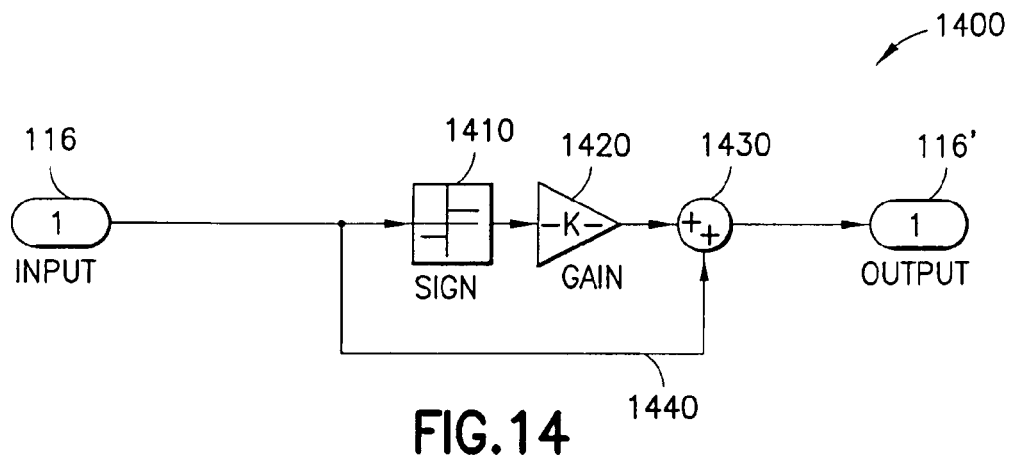
FIG. 14 is a simplified block diagram of an exemplary compensator to reduce dead band in a valve.

A simple compensation technique (and the easiest to visualize and implement) is to simply add an offset value to the input value, where the offset value is selected to have a sign matching the sign of the input value (similar to the signum function). FIG. 14 is a simplified block diagram of an exemplary compensator 1400 used to reduce dead band in an electronically controlled valve. Compensator 1400 is dead band reduction circuitry. Compensator 1400 is described herein as being between the spool position controller 115 and the spool actuator 120 (see FIG. 1). However, the compensator 1400 may also be part of the spool position controller 115. The compensator 1400 includes a signum function module 1410, a gain module 1420, an adder 1430, and a forward feed 1440. The compensator 1400 modifies the control signal 116 to produce the modified control signal 116'. The signum function module 1410 adds an offset value to a value of the control signal 116. For X<0, the signum function module 1410 adds a negative offset value (e.g., approximately −0.15 in the example FIG. 14) to the value of the control signal 116, and for X>0, the signum function module 1410 adds a positive offset value (e.g., approximately +0.15 in the example FIG. 14) to the value of the control signal 116. At zero, in this example, one of the offsets (e.g., −015 or +015) is chosen. The gain module 1420 applies a gain of 0.14 in this example.

Figure 15:
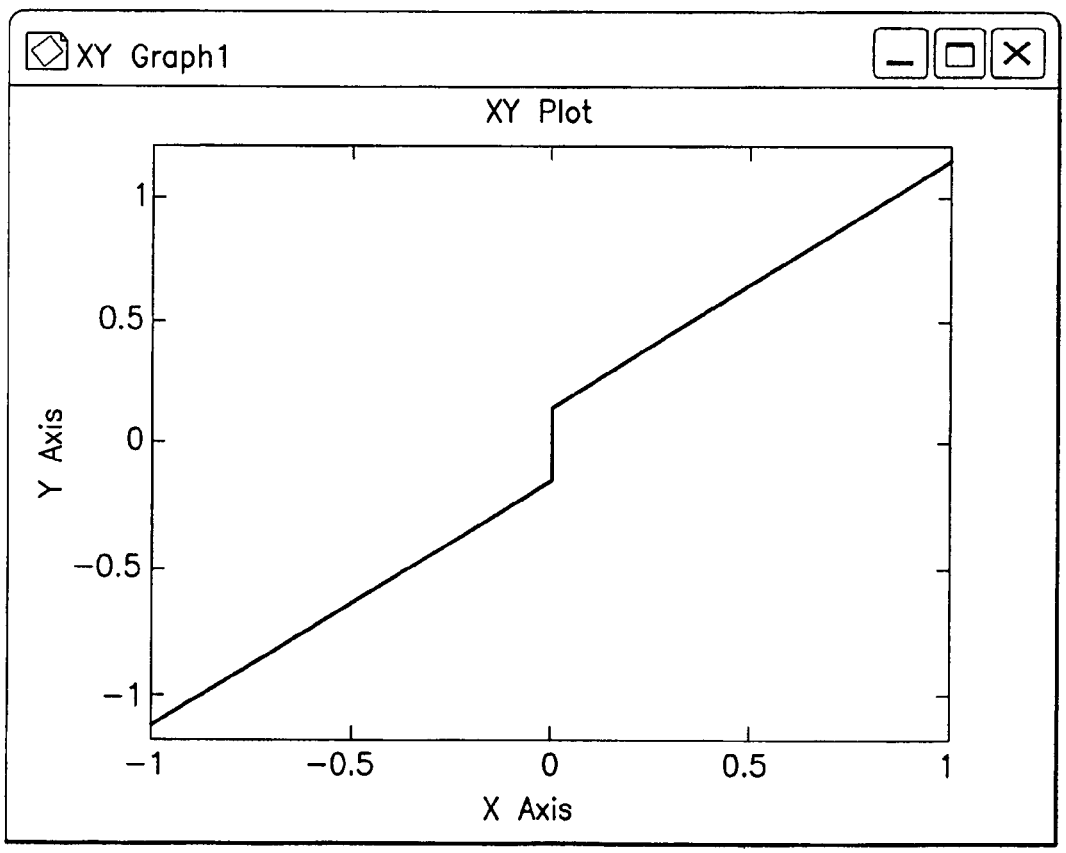
FIG. 15 is a plot of a transfer characteristic of the compensator shown in FIG. 14, with a gain, K, of 0.14.
Figure 16:
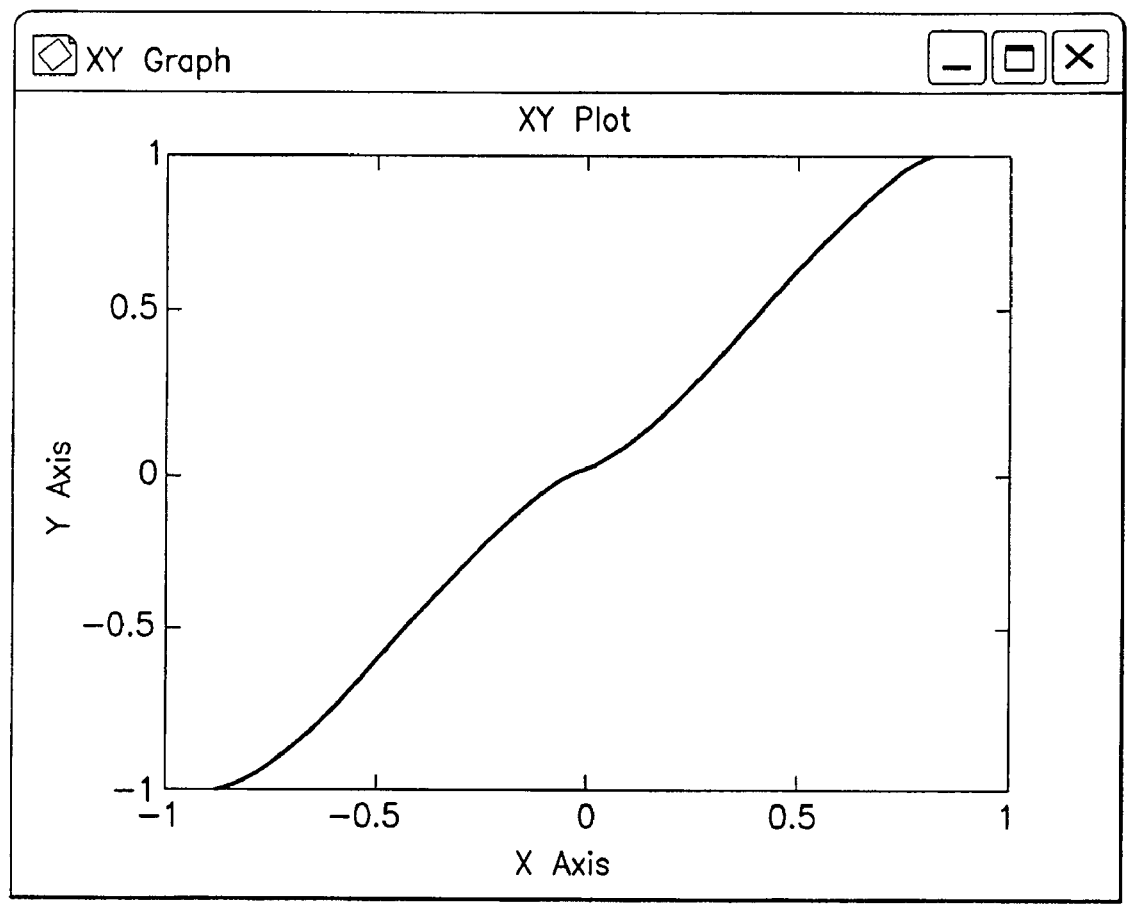
FIG. 16 is a plot of a transfer characteristic for a system that uses the compensator shown in FIG. 14.

A representation of the transfer characteristic for the compensator 1400 is shown in FIG. 15. The system transfer characteristic, which compares the input control signal 116 (e.g., as current) to the aperture of the valve 120, of FIG. 16 shows a much more linear response as compared to the response shown in FIG. 13. The system transfer characteristic of FIG. 16 has virtually no dead band region.

A problem with this solution is the extension of the output beyond a maximum value of '1' (one) before the input reaches its maximum value of '1' (one). The compensator 1400 corrects for the dead band around the input value of zero. However, as the output exceeds ±1 at an input value of approximately ±0.85, this would effectively limit the range of the input if using conventional signal and circuit techniques. In other words, increasing the input past +0.85 yields no further increase in system output (e.g., aperture area).

To correct for this problem, the control signal 116 signal can be gain corrected according to simple linearization. For instance, the minimum and maximum values of X and Y can be used to develop the equation for a line. A slope correction can be determined that can then be used to correct the output range (i.e., relative to the input range).

An example is as follows. Assume the minimum (Min) and maximum (Max) Y values are ±1 when the corresponding Min and Max X values are ±0.86. A straightforward slope calculation reveals an average slope of approximately 1.163. By multiplying the signal by the inverse of this value, i.e., 0.86, it is possible to correct the transfer characteristic to recover the full input range and provide dead band compensation. In other words, an input of one will yield an output of one.

Figure 17:
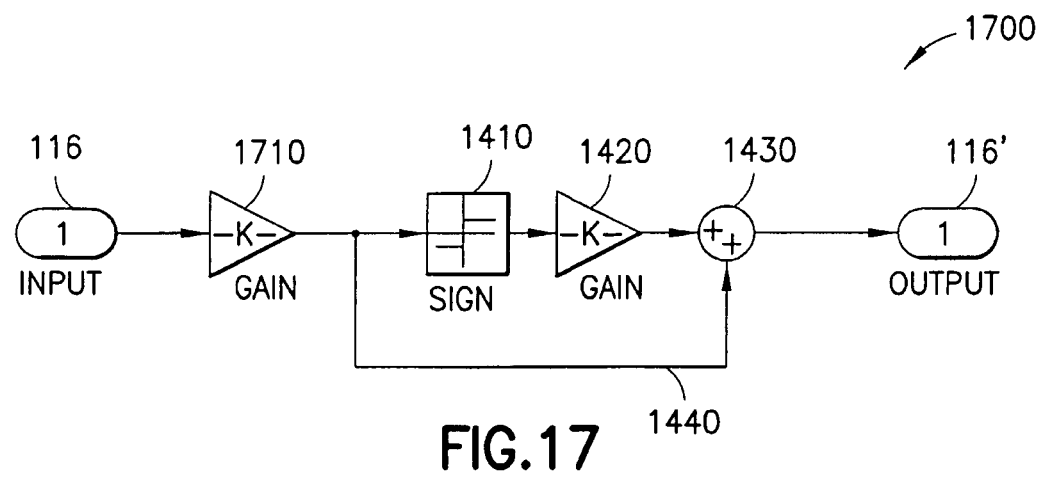
FIG. 17 is a simplified block diagram of another exemplary compensator to reduce dead band in a valve.

FIG. 17 shows a compensator 1700 suitable for correcting the transfer characteristic to recover the full input range and provide dead band compensation. Compensator 1700 is dead band reduction circuitry. The compensator 1700 includes a gain module 1710 having a gain, K, of 0.86 (as determined previously for this example). The system transfer characteristic for a portion of a system including the compensator 1700, which compares the input control signal 116 (e.g., as current) to the aperture of the valve 120, shows a linear response that allows a full range (e.g., −1 to +1) of the input. Alternatively, the summing block may be placed before the gain stage if a value of 1/K is placed in line with the feed-forward path.

Figure 18:
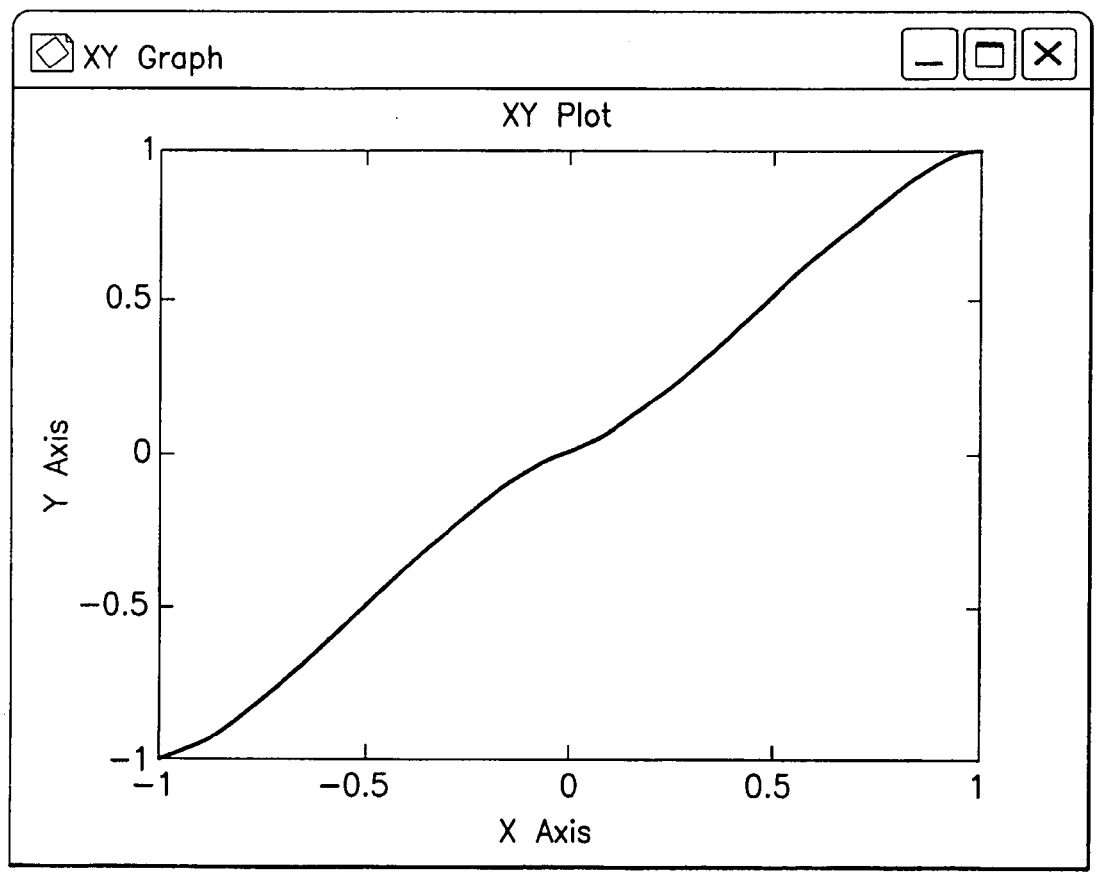
FIG. 18 is a plot of a transfer characteristic for a system that uses the compensator shown in FIG. 17.

An example of the transfer characteristic for a system that uses a compensator 1700 is shown in FIG. 18.

Figure 19:
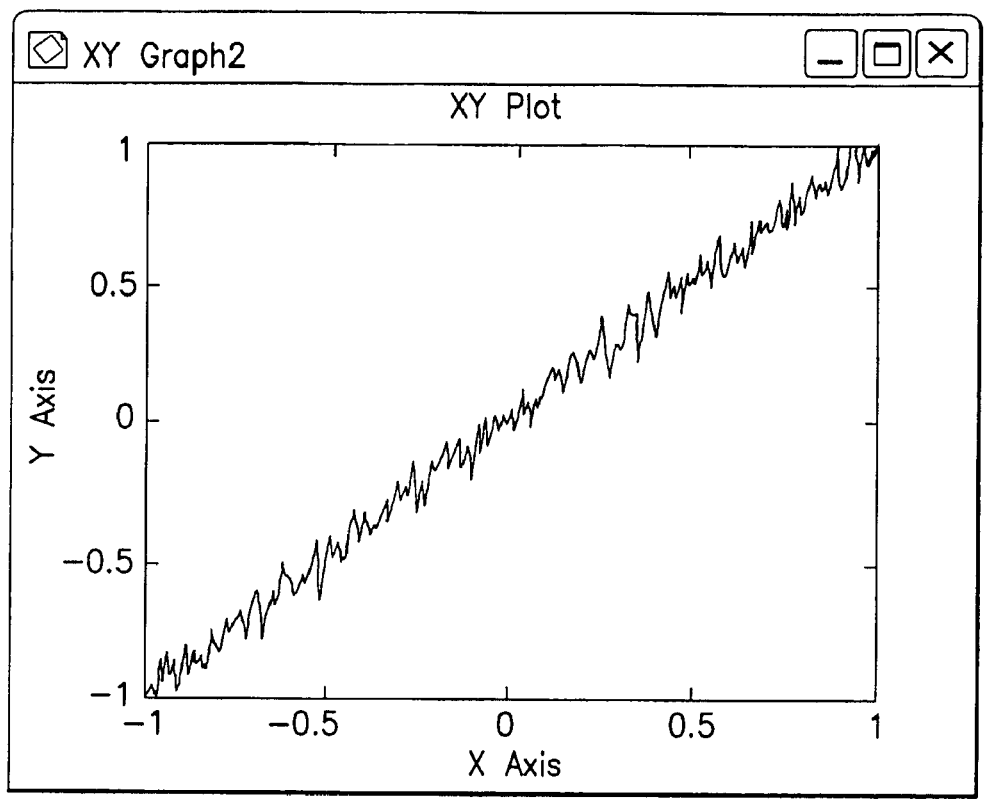
FIG. 19 is a plot of an input signal ramp where noise is included on the input signal.
Figure 20:
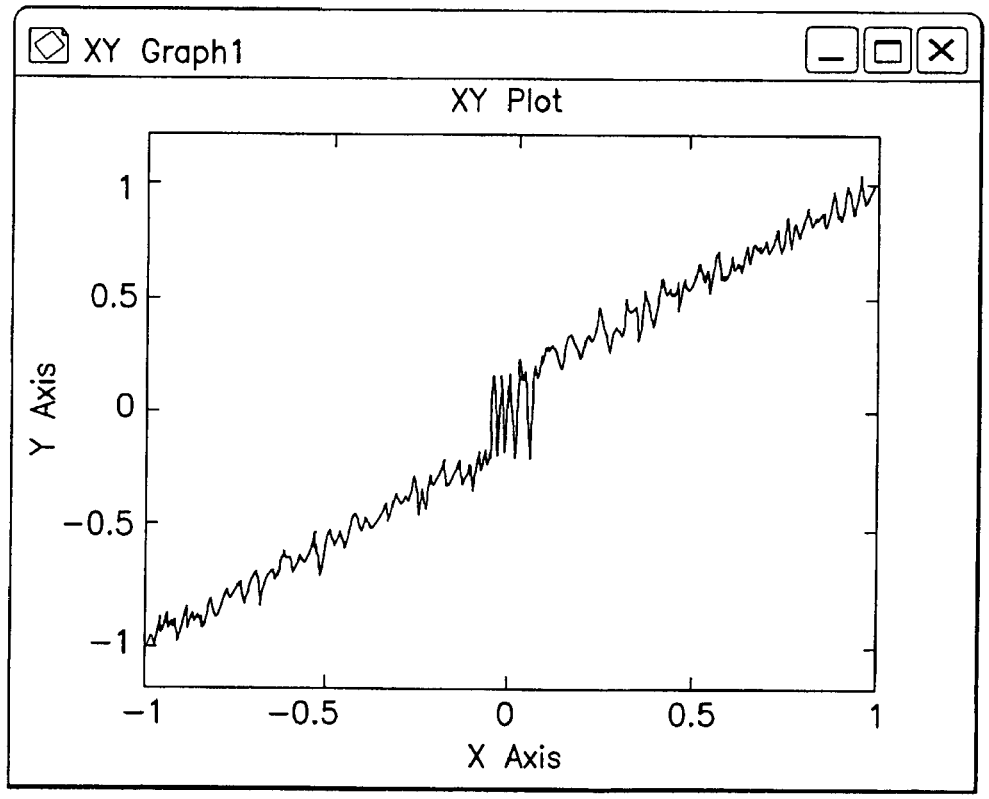
FIG. 20 is a plot of the output of the compensator of FIG. 17, where the noisy input of FIG. 19 is used.

It is common for electronic circuits to experience noisy signals from internal or external sources. An example of a noisy input signal ramp is shown in FIG. 19. FIG. 20 shows output of compensator 1700 based on the noisy input signal ramp shown in FIG. 19. It is easy to see in FIG. 20 that this input could cause undesirable output fluctuations around the zero point using the dead band elimination compensation of FIG. 17. The rapid transitions around the zero region are undesirable and may result in premature valve wear, failure, undesirable system noise or undesirable operation, as non-limiting examples.

Figure 21:
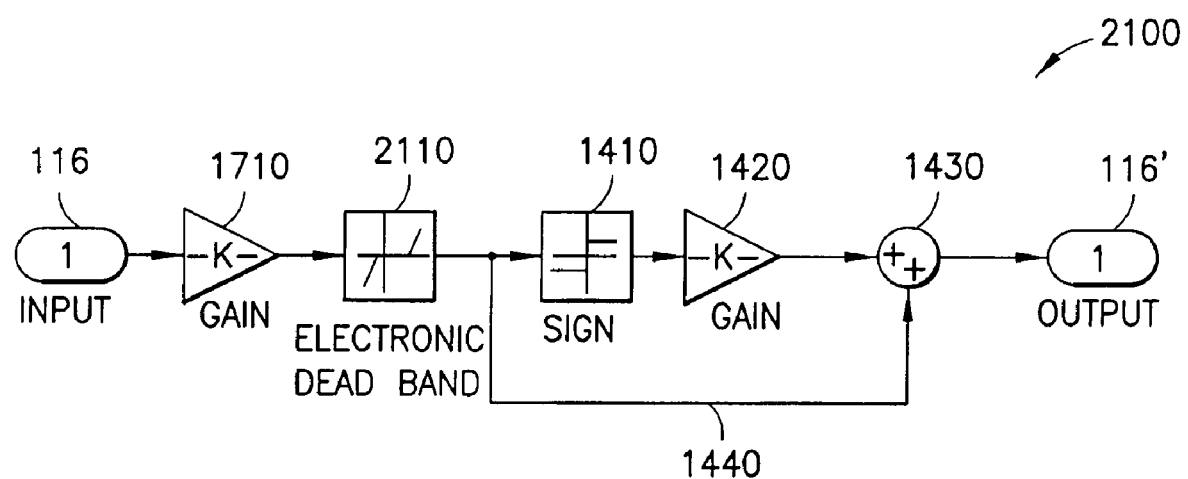
FIG. 21 is a simplified block diagram of another exemplary compensator used in spool position controller to reduce dead band in a valve.

By implementing a noise band around the region where the input signal crosses zero, these rapid transitions may be avoided. The correction is implemented, in the example of FIG. 21, by keeping the output of the compensator 2100 artificially at zero output even though the input is requesting another value. This effectively re-establishes a dead band, albeit, much smaller and more controllable than the original mechanical dead-band. By incorporating this electronic dead band, in electronic dead band module 2110 and into the dead band reduction circuitry of the compensator 2100, it is possible to take advantage of valve leakage performance when a valid input signal of zero is applied (such a signal requesting the valve to be shut), while ignoring erroneous or noisy input signals. When a valid input signal is applied outside of the noise margin range, valve action will occur.

A direct digital system may operate without such a correction where the issued commands are digital commands and not dependent on an analog-to-digital conversion and an associated digital jitter.

Figure 22:
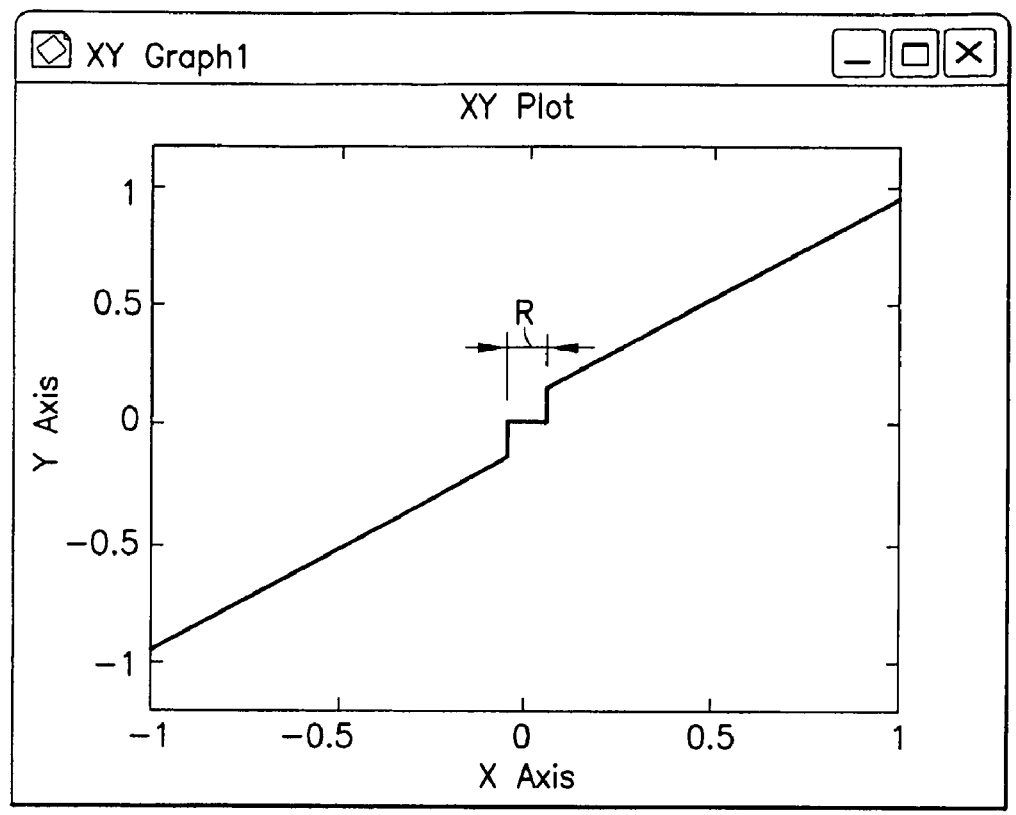
FIG. 22 is a plot of a transfer characteristic of the compensator shown in FIG. 21.
Figure 23:
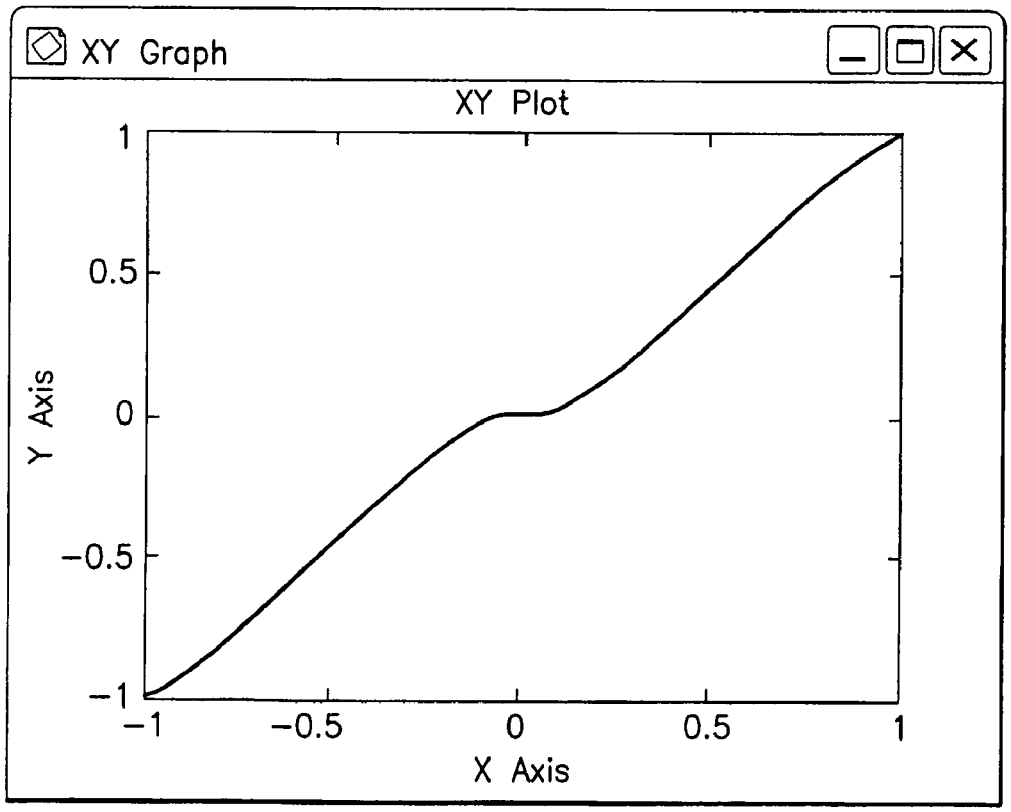
FIG. 23 is a plot of a transfer characteristic for a system that uses the compensator shown in FIG. 21.

FIG. 22 shows an exemplary plot of a transfer characteristic of the compensator 2100 with electronic dead band. As shown in FIG. 22, the electronic dead band module 2110 will basically cause a zero output when the input is within a range, R, that is positioned around zero. The range could be centered or could be positioned off-center. FIG. 23 shows an exemplary plot of a transfer characteristic for a system that uses the compensator 2100.

It is noted that the compensators 1400, 1700, and 2100 can be implemented in hardware, software, or some combination thereof. These compensators may be partially or completely implemented in the spool position controller 115, or may be partially or completely separate from spool position controller 115. It is also noted that FIGS. 14, 17, and 21 can be considered to be methods for dead band reduction. Further, all elements shown in FIGS. 14, 17, and 21 need not be in the orders shown, and some modules could be used without the use of other modules. For instance, a simple technique for dead band compensation could use the signum module 1410 and the gain module 1420, without the use of any of the other elements (including the adder 1430 and the forward feed 1440).

IV. Dead Band Reduction for Exemplary Pneumatic Valves

An overview of dead band reduction has been given. Specific examples of implementations are now presented of dead band reduction, although it should be noted that the disclosed invention is not limited to the following specific examples.

As described above, an aspect of the present invention is directed to control schemes that can be incorporated into analog or digital controllers (e.g., valve controllers 160 of FIG. 1) to compensate for the dead band, while maintaining the current valve design. In other words, and returning to FIGS. 2 and 3, a relatively large width for the land 325 (in particular) may be used to minimize leakage, but the dead band effect caused by the larger width (relative to a smaller width) can be ameliorated. Further, a relatively low manufacturing cost design with larger clearance between the lands 320, 325, and 330 and the inner surface 310 may be used.

The spool 380 (and typically spool 230 of FIG. 2) is assumed to be centered with no current flowing through the voice coil 221 (e.g., spring return to center). The land 320 overlaps the port 281A in the sleeve 260 by the following:

$$\text{Overlap} = (\text{Width of land } 320 - \text{Diameter of port } 281A)/2.$$

Figure 4:
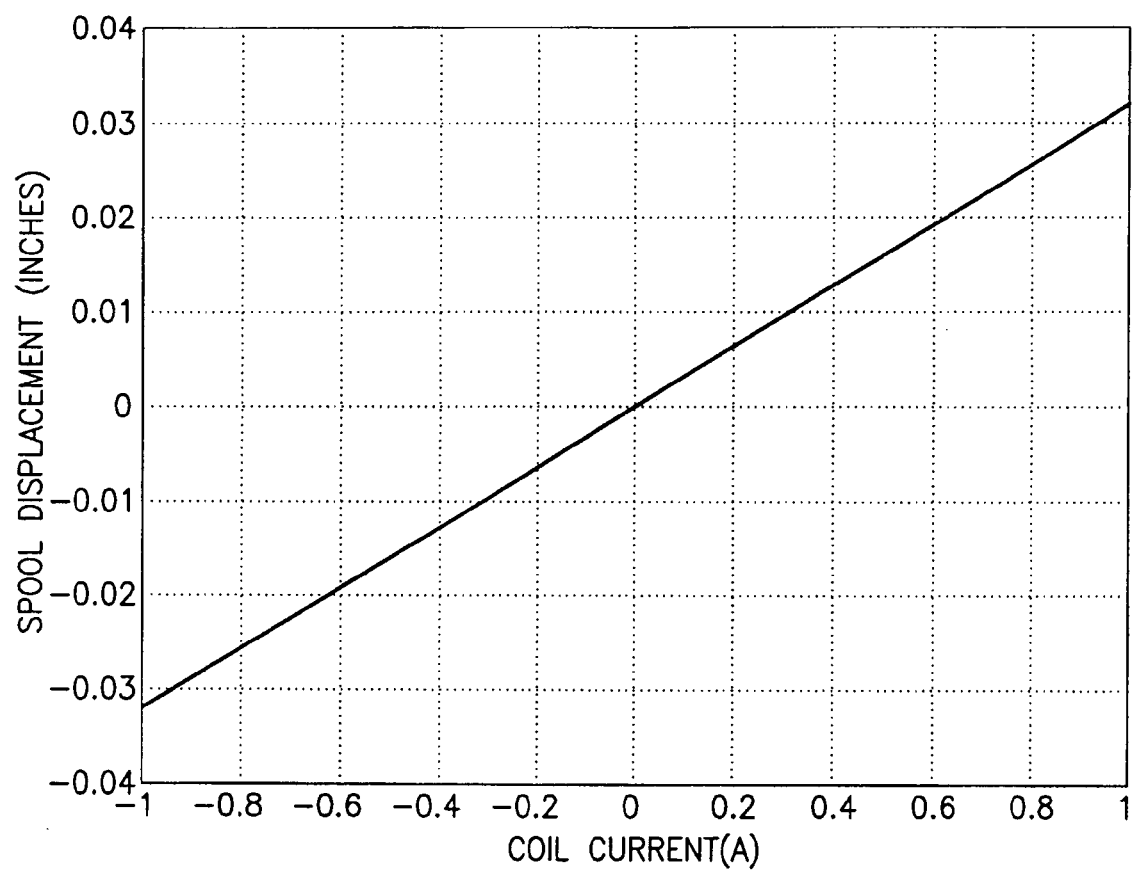
FIG. 4 is a graph of spool displacement versus valve coil current for the exemplary voice coil pneumatic valve of FIG. 2, when the valve is not controlled using dead band correction circuitry.
Figure 5:
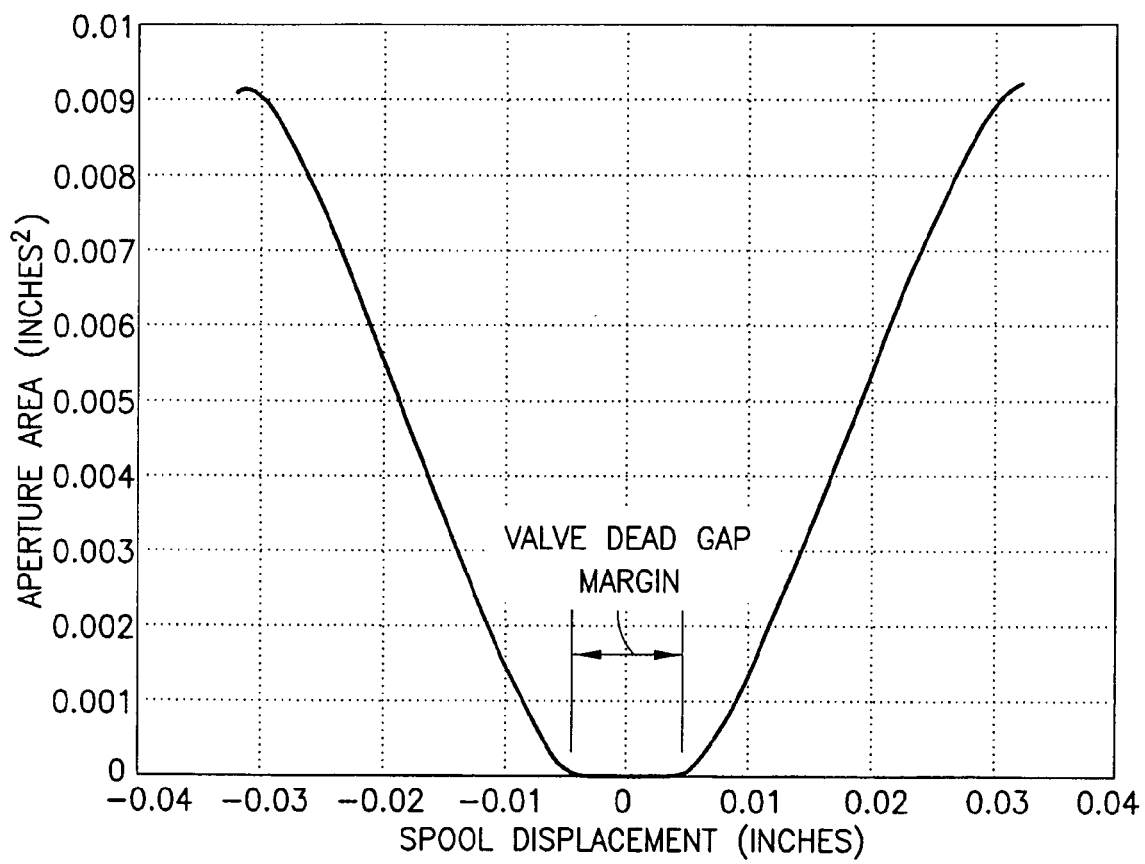
FIG. 5 is a graph of aperture area versus spool displacement for the exemplary voice coil pneumatic valve of FIG. 2.

The Overlap includes portions 340 and 342 as shown in FIG. 2. For this given Overlap, the spool 380 must be driven out of position by a value equal to the Overlap in order to cause a change in aperture area away from zero. A graph of an ideal spool displacement versus coil current is given as FIG. 4. From the onset of opening until full open, the aperture area versus displacement can be determined using basic trigonometric analysis. FIG. 5 shows a graph of aperture area versus spool displacement. Note how for small spool displacements, aperture area remains at zero (e.g., fully closed). Also note how the profile of the curve is non-linear. This is due to the uncovering of a series of circular ports. For most controls applications, the profile in FIG. 5 can be approximated to be linear.

Figure 6:
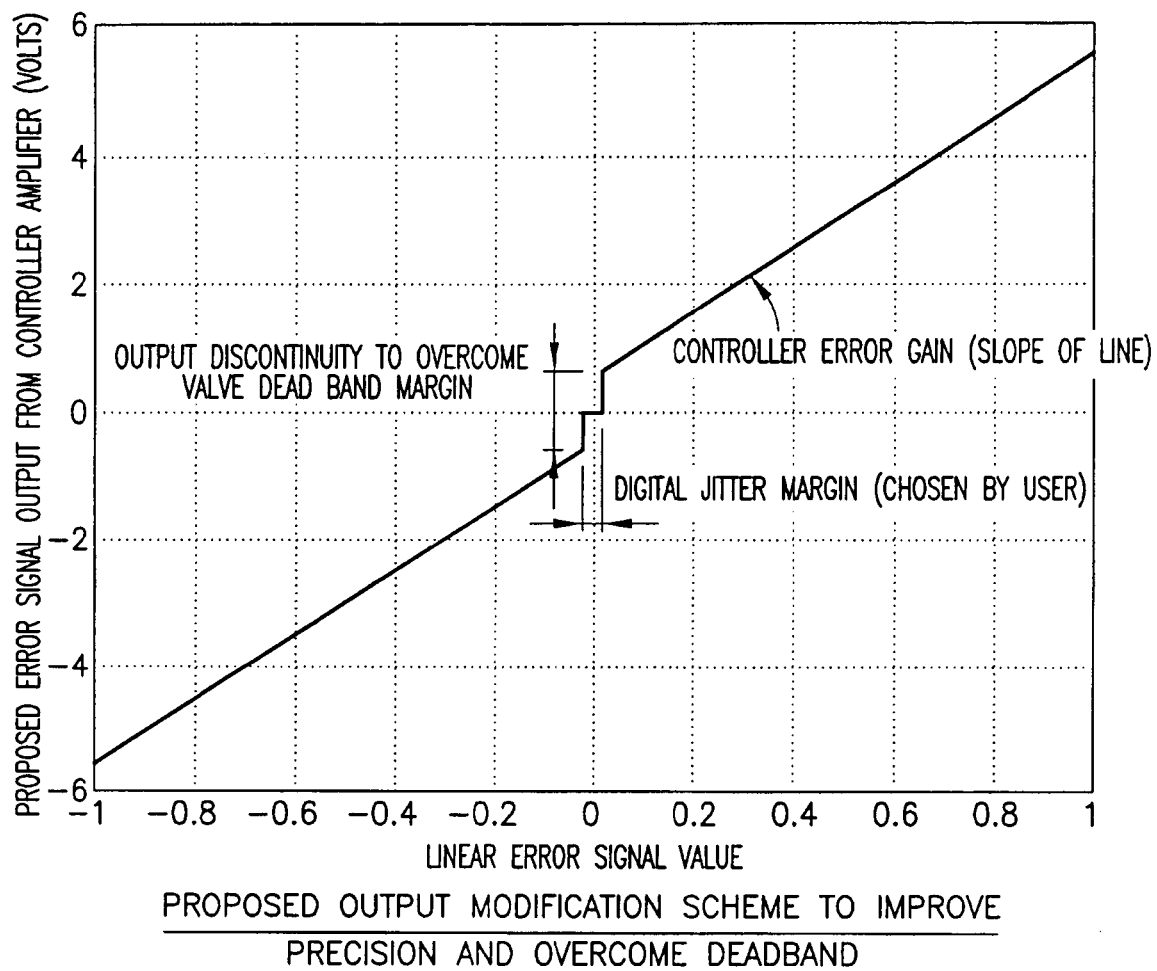
FIG. 6 is a graph of an output modification scheme to improve precision and overcome dead band.

For systems (e.g., systems 100 of FIG. 1) requiring very accurate control and response from the valve 200 with small command signals, a control scheme may be implemented to compensate for the dead band. An exemplary approach used herein is that the output command to the valve be some positive offset value for any small positive error; and consequently a negative offset value for a very small negative error. See FIG. 6 (and also see FIGS. 14-16), which is a graph of an output modification scheme to improve precision and overcome dead band. In FIG. 6, the output discontinuity to overcome dead band margin is shown as an example of creating positive and negative offset values. Such values may be created using analog or digital circuitry.

With larger error signals, the output command would typically follow an error gain slope, as shown in FIG. 6. However, when using a digital controller, some inherent data jitter will be present. See FIGS. 19 and 20. Allowing for some jitter around the zero point may prevent this digital noise from causing a response by the system (shown in FIG. 6 as 'digital jitter margin'). In the example of FIG. 6, the digital jitter margin may be chosen by the user, although the digital jitter margin may also be fixed. See FIGS. 21-23. Incorporating this simple control scheme compensates for the inherent valve dead band and the digital jitter without compromising the high performance characteristics of pneumatic servo control valves such as valve 200 of FIGS. 2 and 3. It is noted that the embodiment shown in FIG. 6 contains all of the dead band compensation techniques described above in reference to FIGS. 14, 17, and 21.

In order to determine benefits of the dead band modification scheme shown in FIG. 6, three tests were performed as follows. Note that reference to previous figures is beneficial.

Test 1: Operate the system under normal operating conditions, without a dead band modification circuit or dither in a circuit of the spool position controller 115 (see FIG. 1). Dither is described in more detail in U.S. patent application Ser. No. 11/973,277 filed contemporaneously herewith and assigned to the assignee of the present application. Briefly, when using dither in an exemplary embodiment, a 2 KHz square wave signal is applied to a control signal (e.g., control signal 116) coupled to the voice coil 221 of the valve 200. Values of the control signal 116 are referred to as a "command". The dither reduces "stiction." The following steps are performed.

A. Step the command from 0-5-0 VDC (volts direct current), which corresponds to 0-50-0 PSI (pounds per square inch) in 1 volt increments. Measure and record the system response.

B. Step the command from 1.000-1.050-1.000 VDC, corresponding to 10.0-10.5-10.0 PSI in 10 millivolt (mv) increments. Measure and record the system response.

This configuration will be operating within the noise band (<20 mv) of an oscilloscope. A Fluke DMM (digital multimeter) will be used to measure the response. FIG. 7 shows certain results of Test 1.

Test 2: Operate the system under normal operating conditions, without the dead band modification circuit in the circuit of the spool position controller 115. Turn dither (2 KHz Square wave) on full signal. Steps A and B are the same. FIG. 8 shows certain results of Test 2.

Test 3: Operate the system under normal operating conditions, with the dead band modification circuit in the circuit of the spool position controller 115. Turn dither (2 KHz Square wave) on full signal. Attenuate RP3 for maximum accuracy. For this test, an LS-C10 (see below) was modified to incorporate a mock dead-band circuit (similar to the dead band modification circuitry 1010 of FIG. 10, described below). RP3 is a potentiometer that provided a way of setting the offset value (e.g., dead band value). Steps A and B are the same. FIG. 9 shows certain results of Test 3.

As can be seen in FIGS. 7-9, FIG. 9 presents feedback voltage values that are closest to corresponding values of the command. Such feedback voltage values are further improved over FIG. 8, which uses dither but does not use a dead band modification circuit.

Figure 10:
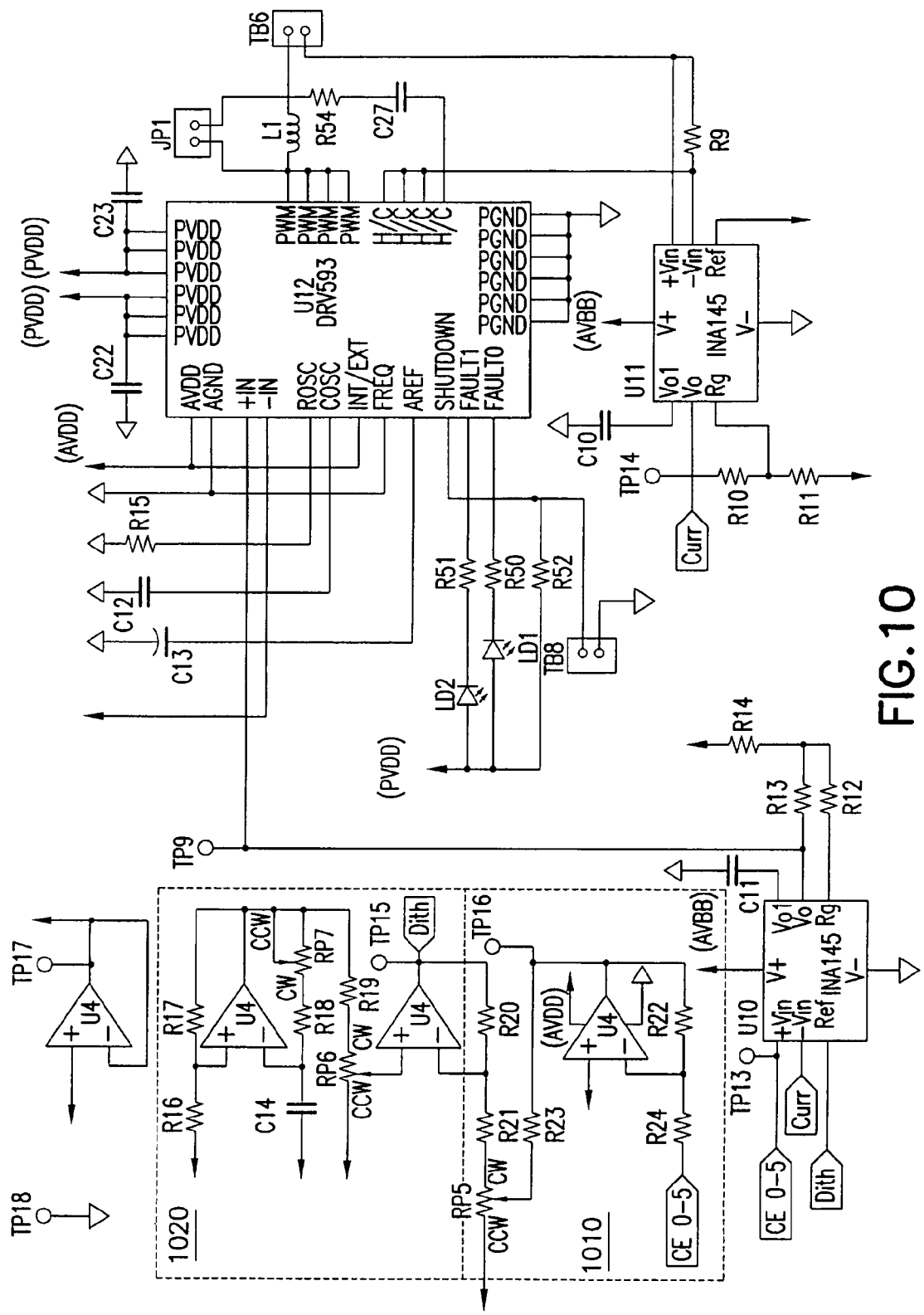
FIG. 10 is a circuit diagram of a first exemplary valve controller.
Figure 11A:
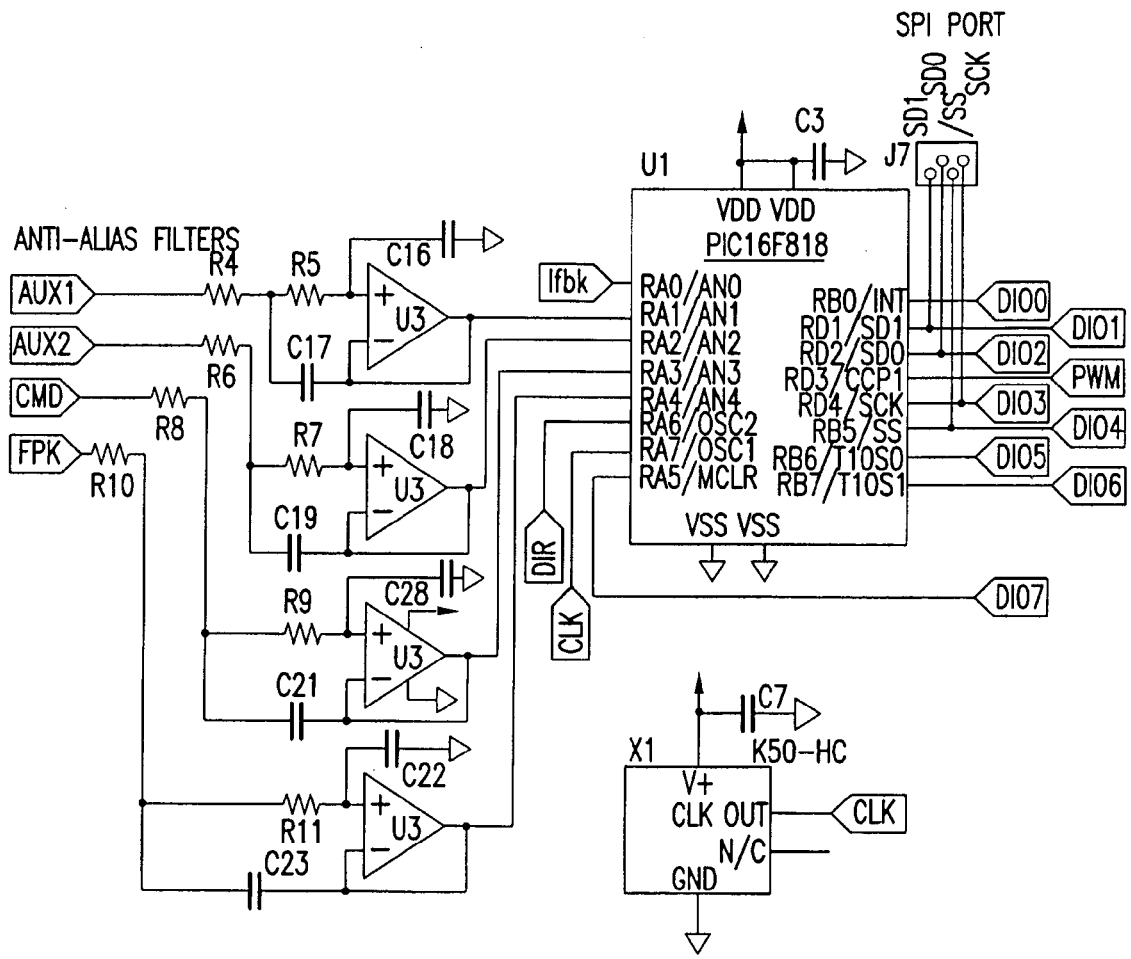
FIG. 11 is a circuit diagram of a second exemplary valve controller.
Figure 11B:
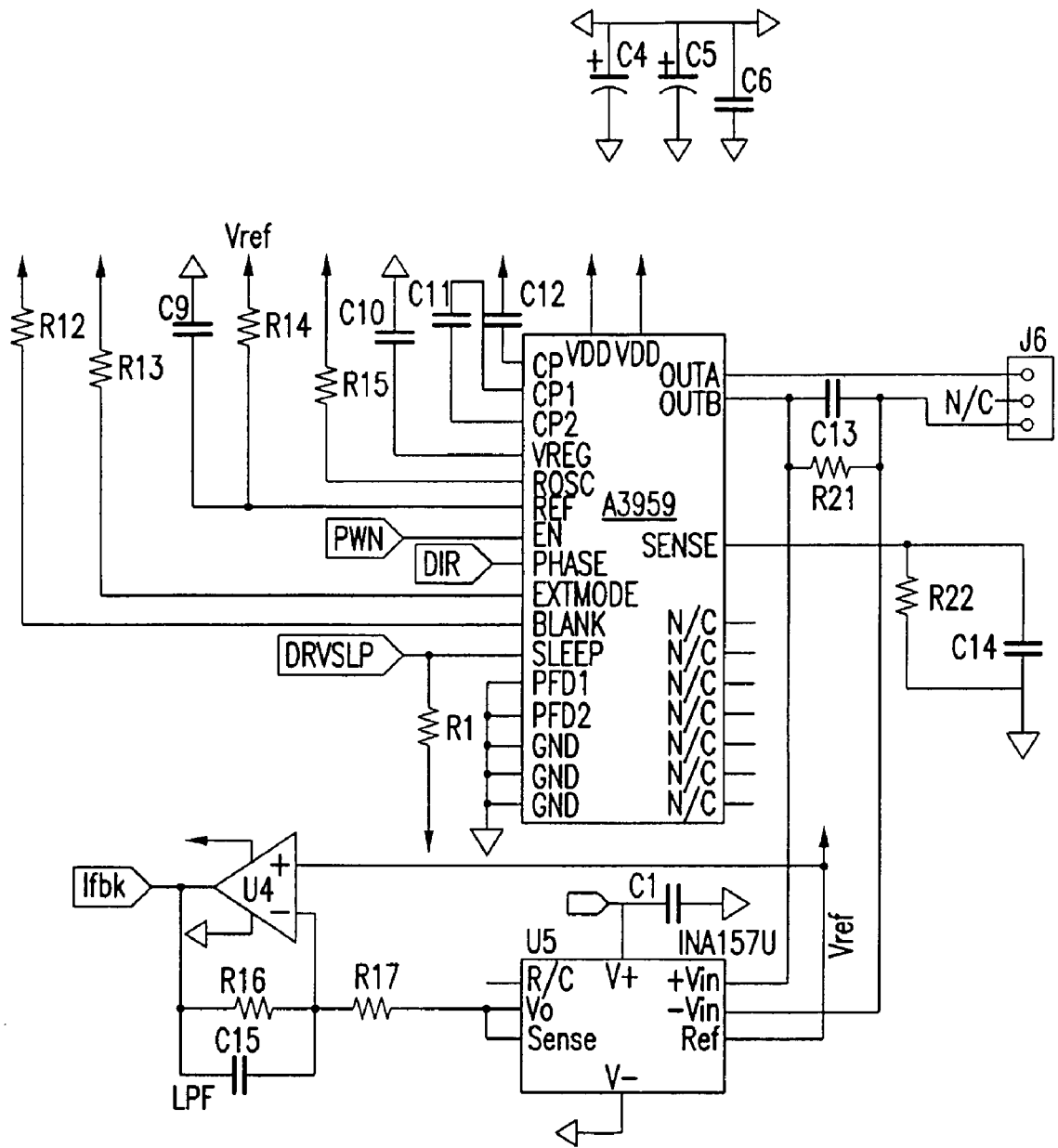

Referring to FIGS. 10 and 11, these figures show two different exemplary valve controllers. The circuits shown in FIGS. 10 and 11 correspond to the adder 110, the spool position controller 115, and the feedback sensor module 150 of FIG. 1. The TB6 connection in FIG. 10 and the J6 connection in FIG. 11 are used to carry the control signal(s) 116. The current sense circuit (including an INA145) in FIG. 10 and current sense circuit (including an INA157) of FIG. 11 are examples of a feedback sensor module 150. The current sense circuit in FIG. 10 uses an INA145 to sense voltage across resistor R9 and to determine current flow through the voice coil using the sensed voltage. Similarly, the current sense circuit in FIG. 11 uses an INA157 to sense voltage across resistor R21 and to determine current flow through the voice coil using the sensed voltage.

Exemplary dead band modification circuitry is shown in block 1010 of FIG. 10. The dead band modification circuitry 1010 is basically a high gain amplifier such that the amplifier saturates away from the zero reference, but is linear near zero. The dead band modification circuitry 1010 does not implement the 'noise immunity' around zero (i.e., the digital jitter margin) as described in reference to FIG. 6. The noise immunity, however, may be implemented in a digital algorithm and has been implemented as follows:

```
if (abs(input) > noise margin)
{
    output = (gain * input + DB_Offset);
}
else
{
    output=0;
}
``` where DB_Offset is generally user adjustable. The digital algorithm described above could be considered to be an implementation of the electronic dead band module 2110 along with an implementation of the signum module 1410 and the gain module 1420 (in this example, without the gain module 1710, adder 1430, and forward feed 1440). Additionally, the DB_Offset value and the 'noise margin' values can be set such that they are not necessarily symmetric about zero, which could provide some tuning advantages. In this case, one would have variables such as "Noise Margin_Positive" and "Noise Margin_Negative". The potentiometer RP5 controls the amplitude of the signal used for dead band reduction/elimination. It is noted that the algorithm above is merely exemplary. The algorithm or a similar algorithm is implemented in the PIC16F818, which is a microcontroller with flash memory, of FIG. 11.

It is noted that there are a large number of techniques to accomplish dead band modification. The circuitry 1010 shown in FIG. 10 and the microcontroller PIC16F818 of FIG. 11 are merely two possible implementations and are not to be limiting. For instance, the PIC16F818 or the circuitry 1010 could be replaced by a more advanced processor or by a very large scale integrated circuit or some combination thereof.

It is noted that block 1020 in FIG. 10 shows an exemplary circuit for providing both amplitude control of dither and frequency control of dither. The rheostat RP6 controls the amplitude of the dither signal, and the rheostat RP7 controls the frequency at which dither occurs. The block 1020 is discussed in more detail in U.S. patent application Ser. No. 11/973,277 filed contemporaneously herewith and assigned to the assignee of the present application.

Figure 24:
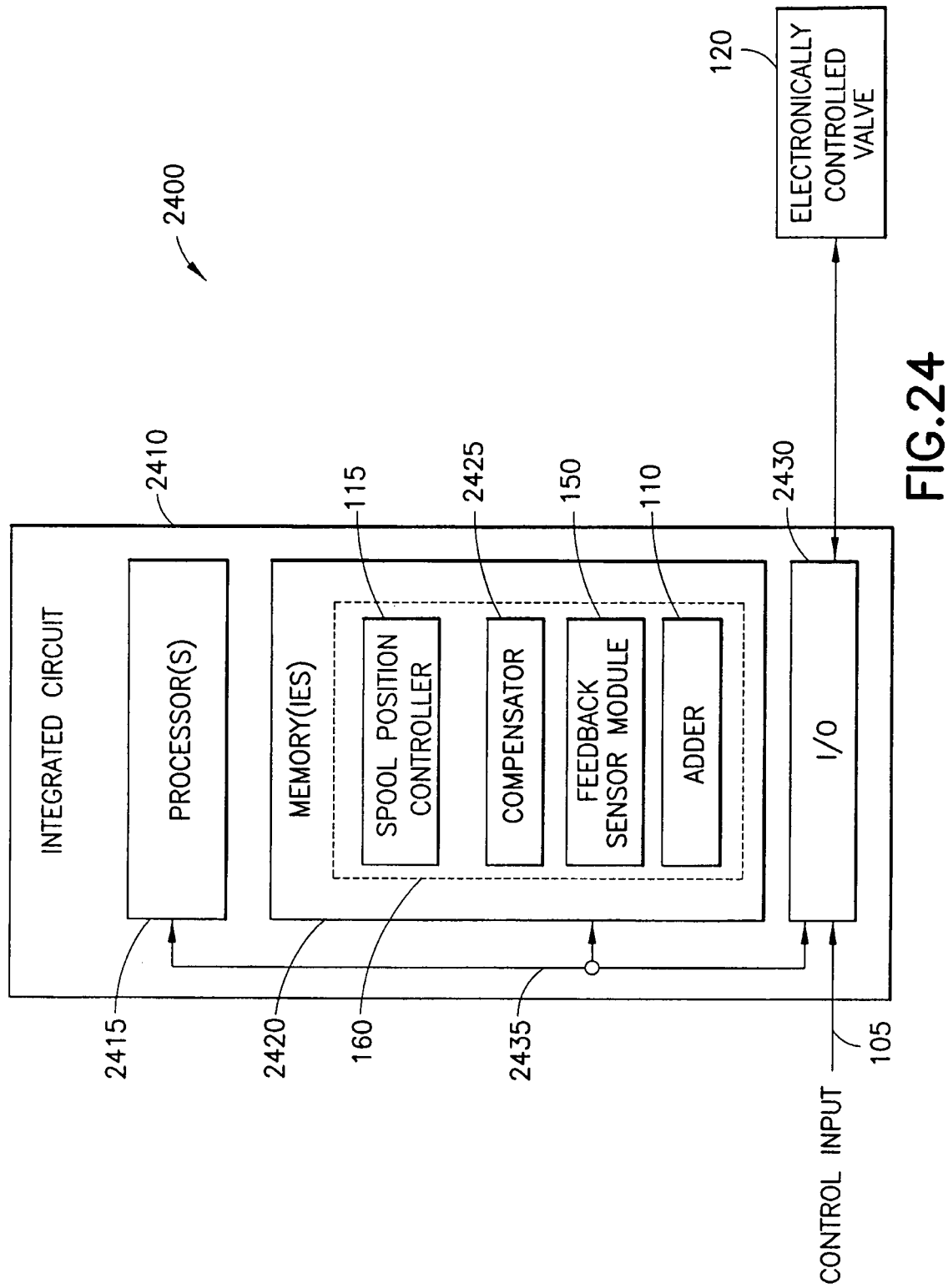
FIG. 24 is an example of a system having a portion for controlling an electronically controlled valve.

In FIG. 11, the PIC16F818 is an example of an implementation where elements of a system for control of an electronically controlled valve are implemented (at least in part) in software executable by a processor in the microcontroller. FIG. 24 shows a simplified block diagram of a system 2400 having a portion for controlling an electronically controlled valve 120. The portion is mainly implemented in the integrated circuit 2410 (such as the PIC16F818). The integrated circuit 2410 includes one or more processors 2415 coupled to one or more memories 2420 and one or more I/O (input/output) ports 2430 through one or more buses 2435. The spool position controller 115, compensator 2425, feedback sensor module 150, and the adder 110 are implemented as software modules. The compensator 2425 is a portion of all of one of the compensators 1400, 1700, 2100, and is shown separately from the spool position controller 115, but could also be implemented as part of the spool position controller 115.

It is noted that the examples shown in FIGS. 2 and 3 of electronically controlled valves are merely exemplary. The coil header assembly 220 and the spool 230 could be combined into a single valve member, for instance. In FIG. 2, the voice coil portion 222 is placed on the coil header assembly 220, while the motor housing 210 has a magnetized portion responsive to the voice coil portion 222. In other embodiments, the motor housing 210 could include the voice coil portion 222 while the coil header assembly 220 includes a magnetized portion responsive to the voice coil portion 222. Furthermore, there are many different types of pneumatic and hydraulic valves for which the techniques described herein are suitable.

Therefore, the exemplary embodiments of the disclosed invention can be applied to any electronically controlled valve having a dead band caused by a land that is wider than an opening such as a port (e.g., 280A, 281A, and 282A of FIG. 2). The port is an example of an opening, and the opening could be a slit, rectangle, or any other suitable pathway for fluid to flow. Similarly, the lands shown in FIG. 2 are merely exemplary and can be other shapes. The dead band can also be caused by one land and associated openings, or by multiple lands and associated openings.

Certain embodiments of the disclosed invention may be implemented by hardware (e.g., one or more processors, discrete devices, programmable logic devices, large scale integrated circuits, or some combination of these), software (e.g., firmware, a program of executable instructions, microcode, or some combination of these), or some combination thereof. Aspects of the disclosed invention may also be implemented on one or more integrated circuits, comprising hardware and perhaps software residing in one or more memories. Embodiments of the disclosed invention may be implemented as a computer program product including program instructions embodied on a tangible computer-readable medium, execution of the program instructions resulting in operations described herein. The computer-readable medium can be, e.g., the memory(ies) 2420, a digital versatile disk (DVD), a compact disk (CD), a memory stick, or other long or short term memory.

The foregoing description has provided by way of exemplary and non-limiting examples a full and informative description of the best techniques presently contemplated by the inventors for carrying out embodiments of the invention. However, various modifications and adaptations may become apparent to those skilled in the relevant arts in view of the foregoing description, when read in conjunction with the accompanying drawings and the appended claims. All such and similar modifications of the teachings of this invention will still fall within the scope of this invention.

Furthermore, some of the features of exemplary embodiments of this invention could be used to advantage without the corresponding use of other features. As such, the foregoing description should be considered as merely illustrative of the principles of embodiments of the present invention, and not in limitation thereof.

What is claimed is:

1. A method comprising:
receiving, at input circuitry, an input signal;
multiplying the input signal by a first gain to generate a first modified signal;
determining whether the first modified signal is within a range positioned around zero and in response to the first modified signal being within the range around zero, zeroing the first modified signal to generate a second modified signal;
generating an intermediate signal, where the sign of the intermediate signal is based at least in part on the input signal;
adding the intermediate signal to the second modified signal to create an output signal; and
outputting, at output circuitry, the output signal, wherein the output signal is configured to be applied to a voice coil of an electronically controlled valve and the electronically controlled valve is configured to use the output signal to control movement of a valve member in the electronically controlled valve, the valve member including at least one land that overlaps an associated at least one opening, and wherein the at least one land is larger than an associated at least one opening such that a dead band is caused, and wherein the output signal is defined to reduce the dead band.

2. The method of claim 1, where generating the intermediate signal comprises:
generating an offset value, wherein the sign of the offset value matches a sign of the input signal; and
providing the offset value as the intermediate signal.

3. The method of claim 2, wherein generating the offset value comprises:
in response to the input signal being less than zero, generating a negative offset value; and
in response to the input signal being greater than zero, generating a positive offset value,
wherein an absolute value of the negative offset value is different from a value of the positive offset value.

4. The method of claim 2, wherein generating the intermediate signal further comprises multiplying the offset value by a second gain prior to providing the multiplied offset value as the intermediate signal.

5. The method of claim 4, wherein:
the first gain is determined at least in part by using a slope of a transfer function determined using operations of generating the offset value, multiplying by the second gain, and adding the intermediate signal to the input signal.

6. The method of claim 1, wherein the range is centered on zero.

7. The method of claim 1, wherein the range is positioned off-center relative to zero.

8. An apparatus comprising:
an input configured to receive an input signal;
a first gain module configured to multiply the input signal by a first gain to generate a first modified signal;
a dead band module configured to determine whether the first modified signal is within a range positioned around zero and in response to the first modified signal being within the range around zero, to zero the first modified signal to generate a second modified signal;
an signum function module configured to generating an intermediate signal, where the sign of the intermediate signal is based at least in part on the input signal;
an adder configured to adding the intermediate signal to the second modified signal to create an output signal; and
an output configured to provide an output signal, wherein the output signal is further configured to be applied to a voice coil of an electronically controlled valve the electronically controlled valve is configured to use the output signal to control movement of a valve member in the electronically controlled valve, the valve member including at least one land that overlaps an associated at least one opening, and the at least one land is larger than an associated at least one opening such that a dead band is caused, and wherein the output is defined to reduce the dead band.

9. The apparatus of claim 8, further comprising a controller configured to provide the input signal to the input.

10. The apparatus of claim 8, where the apparatus is embodied in a spool position controller.

11. The apparatus of claim 8, wherein the signum function module comprises:

an offset module configured to generate an offset value, wherein the offset value has a sign matching a sign of the input signal.

12. The apparatus of claim 11, wherein the offset module is further configured:
   in response to the input signal being less than zero, to generate a negative offset value; and
   in response to the input signal being greater than zero, to generate a positive offset value,
   wherein an absolute value of the negative offset value is different from a value of the positive offset value.

13. The apparatus of claim 11, wherein the apparatus further comprises a second gain module configured to multiply the intermediate signal by a second gain prior to the intermediate signal being added to the input signal by the adder.

14. The apparatus of claim 13, wherein the first gain is determined at least in part by using a slope of a transfer function determined using input values applied to the signum function module, the second gain module, and the adder and determining output values therefrom.

15. The apparatus of claim 8, wherein the range is centered on zero.

16. The apparatus of claim 8, wherein the range is positioned off-center relative to zero.

17. A non-transitory computer-readable medium tangibly embodied with program instructions, execution of the program instructions by a processor resulting in operations comprising:
   receiving an input signal;
   multiplying the input signal by a first gain to generate a first modified signal;
   determining whether the first modified signal is within a range positioned around zero and in response to the first modified signal being within the range around zero, zeroing the first modified signal to generate a second modified signal;
   generating an intermediate signal, where the sign of the intermediate signal is based at least in part on the input signal;
   adding the intermediate signal to the second modified signal to create an output signal; and
   outputting the output signal, wherein the output signal is configured to be applied to a voice coil of an electronically controlled valve, the electronically controlled valve is configured to use the output signal to control movement of a valve member in the electronically controlled valve, the valve member including at least one land that overlaps an associated at least one opening, and wherein the at least one land is larger than an associated at least one opening such that a dead band is caused, and wherein the output signal is defined to reduce the dead band.

18. The computer-readable medium of claim 17, where generating the intermediate signal comprises:
   generating an offset value, wherein the sign of the offset value matches a sign of the input signal;
   multiplying the offset value by a second gain prior to providing the offset value as the intermediate signal; and
   providing the multiplied offset value as the intermediate signal, and
   where the first gain is determined at least in part by using a slope of a transfer function determined using operations of generating the offset value, multiplying by the second gain, and adding the intermediate signal to the input signal.

* * * * *